United States Patent
Payne et al.

(10) Patent No.: US 6,701,145 B2
(45) Date of Patent: Mar. 2, 2004

(54) METHOD AND SYSTEM FOR REDIRECTING CALLS PLACED TO A MOBILE PHONE TO A SECOND PHONE

(75) Inventors: David M. Payne, Meridian, ID (US); Richard L. Payne, Caldwell, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 8 days.

(21) Appl. No.: 09/918,352

(22) Filed: Jul. 30, 2001

(65) Prior Publication Data

US 2003/0022660 A1 Jan. 30, 2003

(51) Int. Cl.[7] .................................. H04M 3/42
(52) U.S. Cl. ................. 455/417; 455/462; 455/555
(58) Field of Search ............................. 455/417, 416, 455/462, 555, 427, 426, 422, 428, 550, 552

(56) References Cited

U.S. PATENT DOCUMENTS

| | | | | |
|---|---|---|---|---|
| 4,456,793 A | * | 6/1984 | Baker et al. | 379/56.3 |
| 5,903,833 A | * | 5/1999 | Jonsson et al. | 455/417 |
| 6,049,712 A | * | 4/2000 | Wallinder | 455/414 |
| 6,151,500 A | * | 11/2000 | Cardina et al. | 455/435 |
| 6,208,854 B1 | * | 3/2001 | Robert et al. | 455/417 |
| 6,421,536 B1 | * | 7/2002 | Uranaka et al. | 455/417 |

* cited by examiner

*Primary Examiner*—Charles Appiah
*Assistant Examiner*—Nghi H. Ly

(57) ABSTRACT

A method for redirecting calls placed to a mobile phone having a redirect functionality and a second phone via a redirect service, which includes the steps of sending a redirect service request using the redirect button on the mobile phone to the second phone, activating the redirect service by the second phone responsive to the redirect service request, and redirecting incoming calls to the mobile phone to the second phone.

28 Claims, 5 Drawing Sheets

METHOD AND SYSTEM FOR REDIRECTING CALLS PLACED TO A MOBILE PHONE TO A SECOND PHONE

The present invention generally relates to an improved method and system for redirecting calls placed to a mobile phone to a second phone via a redirect service. More specifically, it relates to an improved method and system for redirecting calls placed to a mobile phone having a redirect functionality to a second phone via a redirect service.

BACKGROUND OF THE INVENTION

Call forwarding or call redirecting is a common feature of mobile phones. The call forwarding feature allows the user of a mobile phone to redirect all incoming calls on the mobile phone to another designated phone number, such as a land-line phone. This feature is often utilized by users because, unlike land-line phones, mobile phones tend to have breakage in their connection. Currently, the land-line phones generally provide clearer connections. A further incentive is that the calling rate is often less costly on the land-line phones, and, unlike mobile phones, they are not battery or reception limited.

However, in order to request this feature, users must first dial an activation number code (e.g., *71) from the mobile phone. The user must then dial the phone number to which the calls should be redirected. The call forwarding feature is not activated until all these required numbers are entered.

One problem with the prior method is that activation requires users to dial at least 10 digits on the mobile phone, which can be bothersome to many people. Another problem is that the prior method requires the user to know the actual phone number of the other phone. This can be easily accomplished if the user is at home or work. However, it may be a problem when the user cannot obtain the phone number so easily, such as when the user is working at a customer's site or staying in a hotel.

Still another problem is that if the mobile phone is out of the service zones or communication range, users cannot activate the call forwarding feature, since they are unable to communicate with their mobile service center. Similarly, when the battery power of the mobile phone is too low for mobile communications, the call forwarding feature cannot be activated. There are many problems and inconveniences with the current method.

Consequently, there is a need for an improved method and system that can provide a more direct way to activate the call forwarding feature on a mobile phone while lessening the dependence on reception and battery power of the mobile phone.

BRIEF SUMMARY OF THE INVENTION

The present invention relates to an improved method and system for redirecting calls placed to a mobile phone to a second phone via a redirect service. One embodiment of the present invention relates to an improved method and system for redirecting calls on a mobile phone having a redirect functionality to a second phone via a redirect service.

The present invention in the preferred embodiment provides a method that includes the steps of requesting the redirect service using the redirect functionality on the mobile phone, activating the redirect service responsive to the redirect service request, obtaining the phone number of the mobile phone by the redirect service, and redirecting incoming calls on mobile phone to the second phone.

The present invention in another embodiment further provides a system that includes a second phone for receiving redirected incoming calls from a mobile phone, a mobile phone having a redirect functionality for sending a redirect service request to the second phone, an activator for activating the redirect service using the second phone responsive to the redirect service request from said mobile phone, and a redirect service for redirecting incoming calls to the mobile phone to the second phone.

The present invention in a further embodiment provides another system for redirecting calls on a mobile phone having a redirect functionality to a second phone via a redirect service, which includes a mobile phone being capable of sending a redirect service request using the redirect functionality on the mobile phone, an activator being capable of activating the redirect service responsive to the redirect service request, and a redirect service being capable of directing incoming calls to the mobile phone to the second phone.

DETAILED DESCRIPTION

Broadly stated, the present invention relates to an improved method and system for redirecting calls placed to a mobile phone to a second phone via a redirect service. Various embodiments of the present invention provide ways to activate a redirect service that are simpler than traditional methods of call forwarding.

Figure 1:
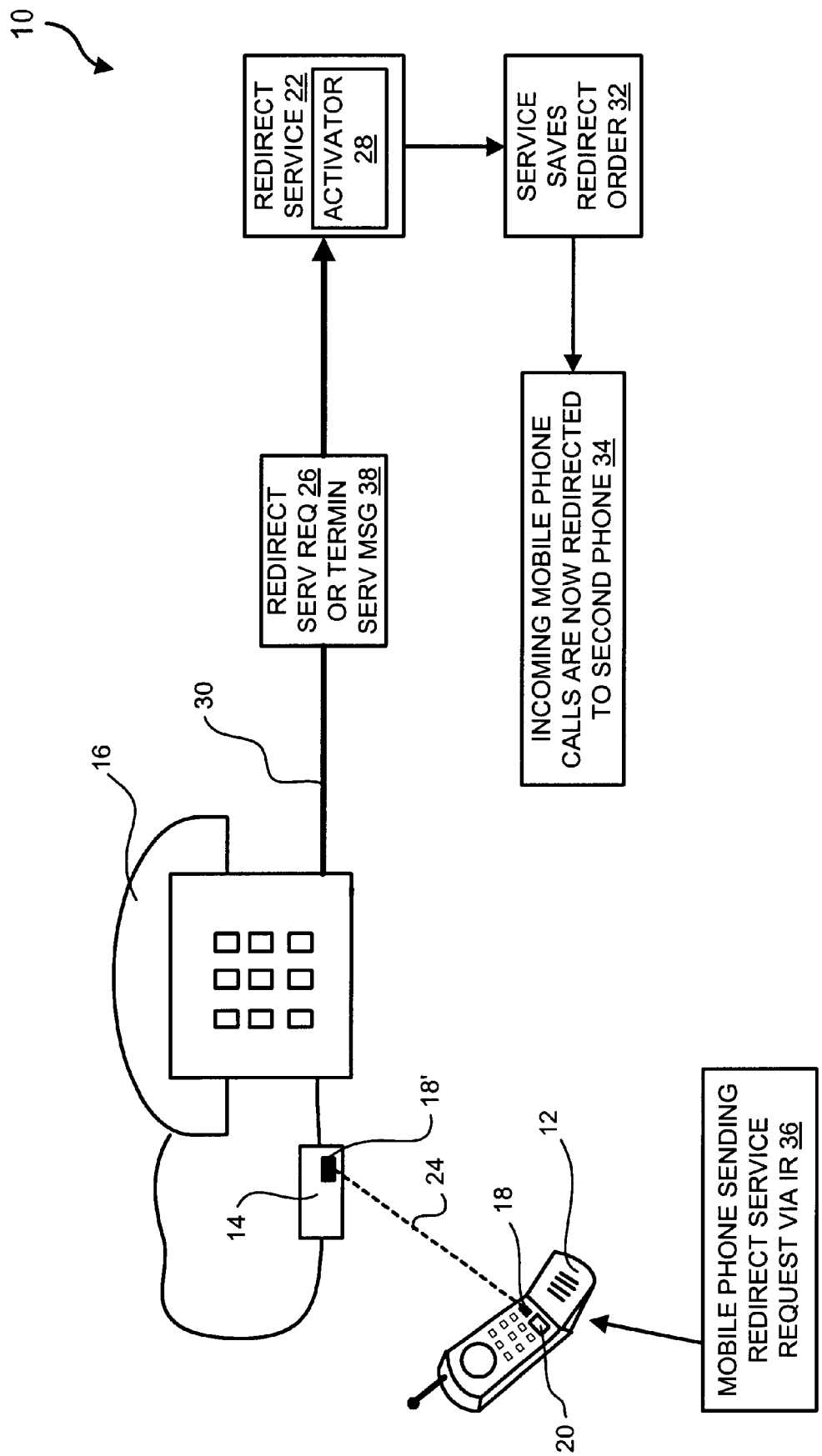
FIG. 1 is a first phone system embodying the present invention.

Turning now to the drawings, and particularly FIG. 1, one embodiment of a phone system in which the present method can be implemented is shown and indicated generally at 10. In the first embodiment, a mobile phone 12 is linked to a redirect device 14 that is physically connected to a second phone 16, such as a standard land-line phone. The mobile phone 12 communicates with the redirect device 14 using an infrared link between transmitter/receiver units 18, 18' located in the phone 12 and the device 14. Because the redirect device 14 is connected to the second phone 16, it, in turn, communicates information from the mobile phone to the second phone. There is preferably a redirect functionality 20 on the mobile phone 12 to initiate the redirecting method. While a button is preferred for the implementation of the redirection functionality 20, it should be understood that other types of hard and soft buttons may also be used, such as menus selection displayed on the liquid crystal display ("LCD") screens of the mobile phone. Furthermore, voice activation is also contemplated, and these various ways to implement the redirect functionality are to be understood to be within the scope of the present invention.

When a user wishes to activate a redirect service 22, the user simply pushes the redirect button 20 located on the mobile phone 12. The mobile phone 12 then sends an infrared signal 24 that includes a redirect service request 26, which preferably includes the mobile phone number and information relating to an activator 28 that is designed to activate the redirect service. The redirect service request 26 from the mobile phone 12 triggers the second phone to initiate a connection with the activator 28. In the current embodiments of the present invention, the activator is preferably a redirect service phone number. However, as the telephones become more integrated to computers and the Internet, the activator can be implemented in numerous ways, such as using a Uniform Resource Locator (URL) or cell tower, and these other implementations of the activator 28 are within the scope of the present invention.

The second phone 16, in response to the infrared signal 24 sent from the mobile phone 12, automatically dials the redirect service phone number, and the redirect service request 26 is sent through the phone line 30 for activating the redirect service. Once the redirect service is activated by the redirect service request, it will obtain the mobile phone number from the redirect service request. Further, the redirect service also preferably obtains the second phone's number from its connection with the second phone itself. The redirect service 22, using the mobile phone's number and the second phone's number, then accordingly saves a redirect order 32 for redirecting the incoming calls to the mobile phone to the second phone 34. Consequently, the mobile phone 12 is able to implement the redirecting of phone calls to the second phone using the redirect button 20, which activates the sending of an infrared signal of a redirect service request 36.

When the user is ready to terminate the redirect service, the user preferably pushes the redirect button 20 again, and a terminate redirect service message 38 will be transmitted to the second phone 16. The second phone dials the redirect service 22 phone number to relay the terminated redirect service message 38, and the redirect service then ends.

Figure 2:
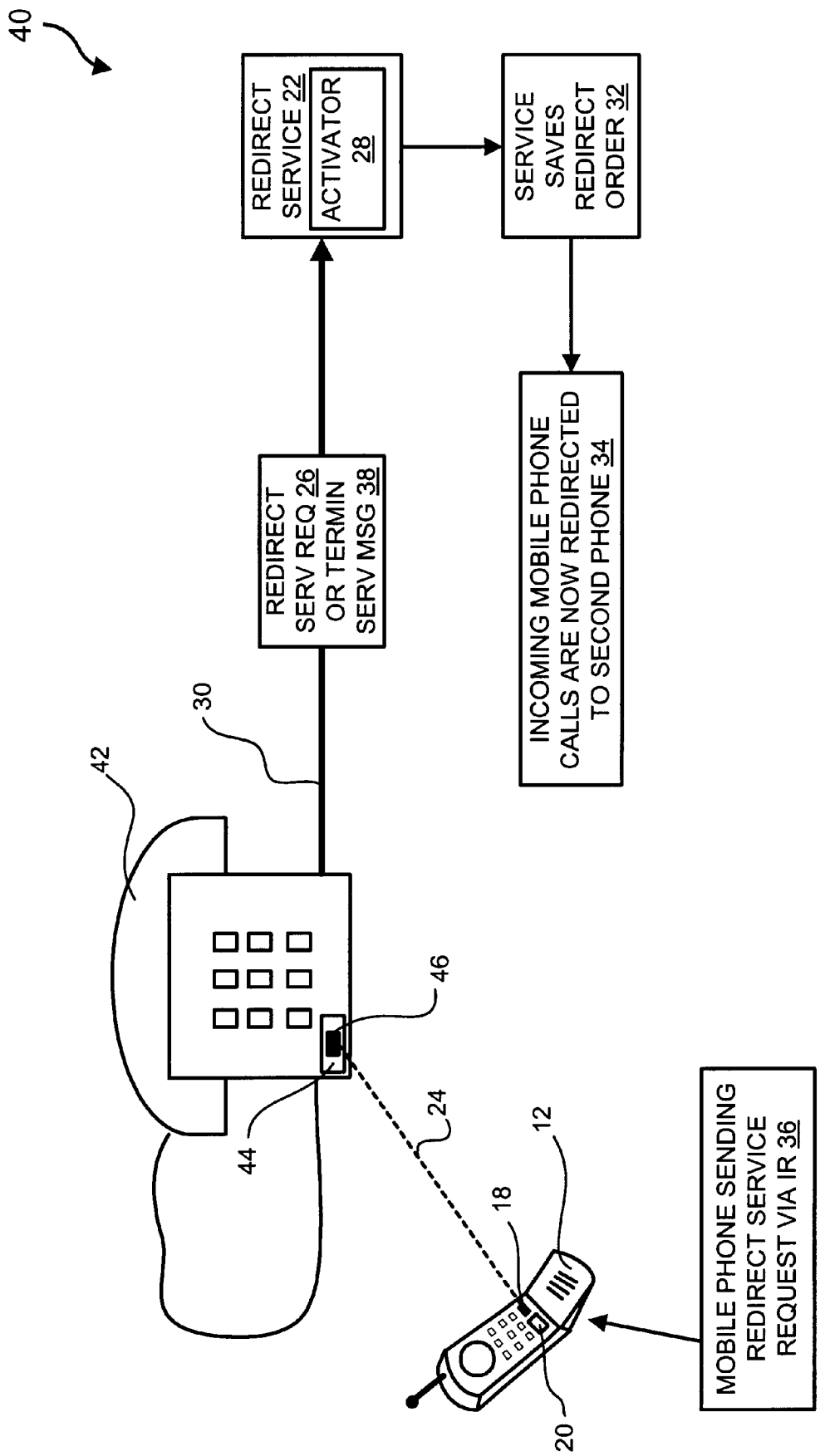
FIG. 2 is a second phone system embodying the present invention.

A second embodiment of a phone system is shown in FIG. 2 and indicated generally at 40. Similar to the first embodiment, the present embodiment uses infrared signals 24. However, in this embodiment, the second phone 42 is not a standard phone, but rather is one that has a redirect device 44 with an infrared transmitter/receiver unit 46 configured in it. In this embodiment, the second phone 44 must be configured to work with the redirect button 20 on the mobile phone 12.

Figure 3:
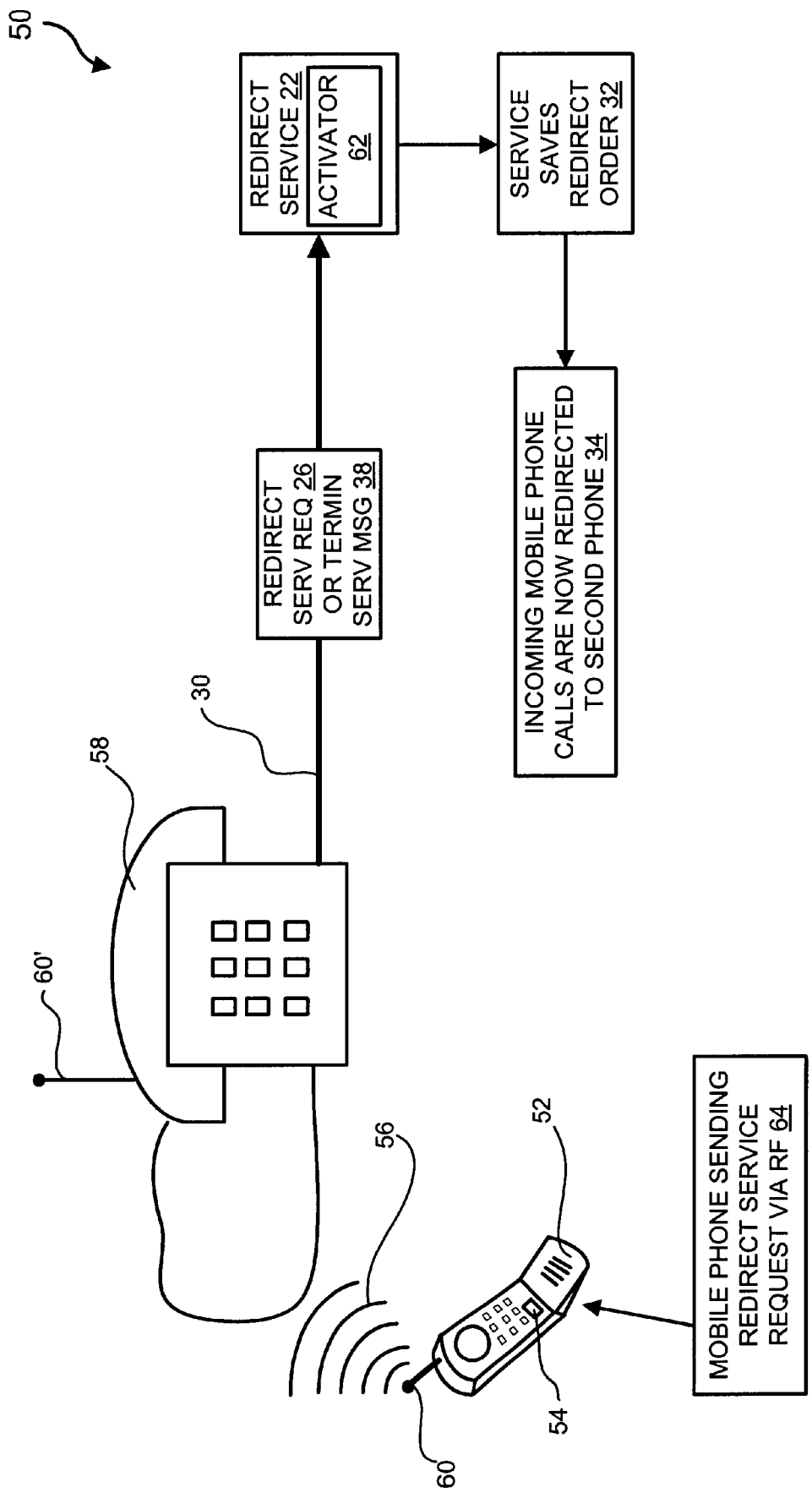
FIG. 3 is a third phone system embodying the present invention.

A third embodiment of a phone system of the present invention is shown in FIG. 3 and indicated generally at 50. In this embodiment, a mobile phone 52 is again configured with a redirect button 54. When a user presses the redirect button 54, the mobile phone 52 is configured to send a radio frequency signal 56 containing a redirect service request 26 with the mobile phone's number to a second phone 58. Thus, the mobile phone 52 and the second phone 58 are configured with antennas 60, 60' to effectuate the radio frequency 56 communications.

When the second phone 58 receives the redirect service request 26 from the mobile phone 52, it is configured to contact an activator 62 designed to activate the redirect service 66. Similar to the previous embodiments, the activator 62 is preferably a redirect service phone number. In response to the redirect service request, the second phone 58 then dials the redirect service phone number (i.e., connecting with the activator) 62 to relay the mobile phone's number and the second phone's number, via the phone line 30, for activating the redirect service 22. The redirect service 22 accordingly saves a redirect order 32 for redirecting incoming calls on the mobile phone to the second phone 34. As shown, in this embodiment, the mobile phone can send a radio frequency signal to activate the redirect service with the use of the redirect button 64. Similarly, with the use of the radio frequency transmission, the mobile phone can also send a terminate redirect service message to the second phone 58, which will then forward the message to the redirect service 22 via the phone line 30.

Figure 4:
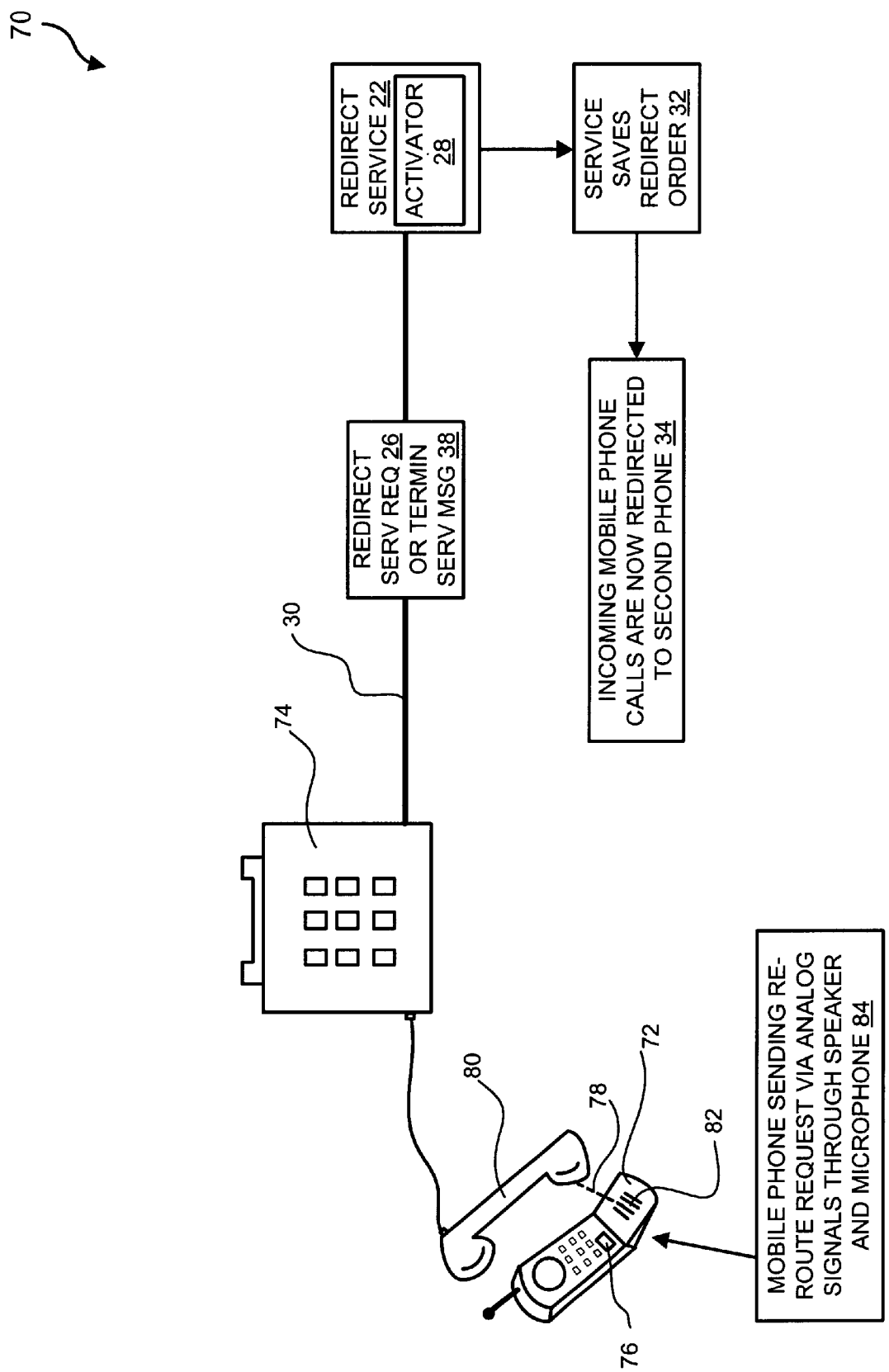
FIG. 4 is a fourth phone system embodying the present invention.

Turning now to a fourth embodiment of a phone system of the present invention is shown in FIG. 4 and generally indicated at 70. Similar to the previous embodiments, the mobile phone 72 is configured to send the redirect service request 26 to a second phone 74, which is preferably a standard phone, using a redirect functionality (e.g., redirect button) 76. However, in order to work with a standard phone 74, the mobile phone 72 is configured to send the redirect service request 26 to the standard phone 74 using Dual Tone Multi Frequency ("DTMF") tones 78 upon the redirect button 76 being pushed. Because the standard phone 74 can receive these DTMF tones 78 through its handset 80, users must place the handset 80 of the standard phone, more specifically the microphone of the handset, to the speaker 82 of the mobile phone 72 when these DTMF tones are being transmitted.

Similar to the previous embodiment, the activator 28 is preferably a redirect service phone number. Consequently, the redirect service request preferably contains instructions for dialing the redirect service phone number to activate the redirect service 22. After being activated, the redirect service obtains the mobile phone's number from the redirect service request and the standard phone's number from the connection with the standard phone. Using the phone numbers obtained, the redirect service saves a redirect order 32 to redirect calls to the standard phone 74. As shown, the redirect service is initiated using analog signal 84 (e.g., DTMF tones).

However, once the user wishes to terminate the redirect service, the user only has to push the redirect button 102 again to send a terminate redirect service message 38 to the redirect service 22. More specifically, in response to the redirect button, the mobile phone 92 dials the redirect service phone number to relay the terminate redirect service message 38, and the redirect service 22 will be terminated. Note that with the current embodiment, the mobile phone is out of range or low on battery power (i.e., not enough power to transmit, but sufficient power to audio encode through its speaker), the mobile phone is able to direct the standard phone negotiate the redirect order with the redirect service.

Figure 5:
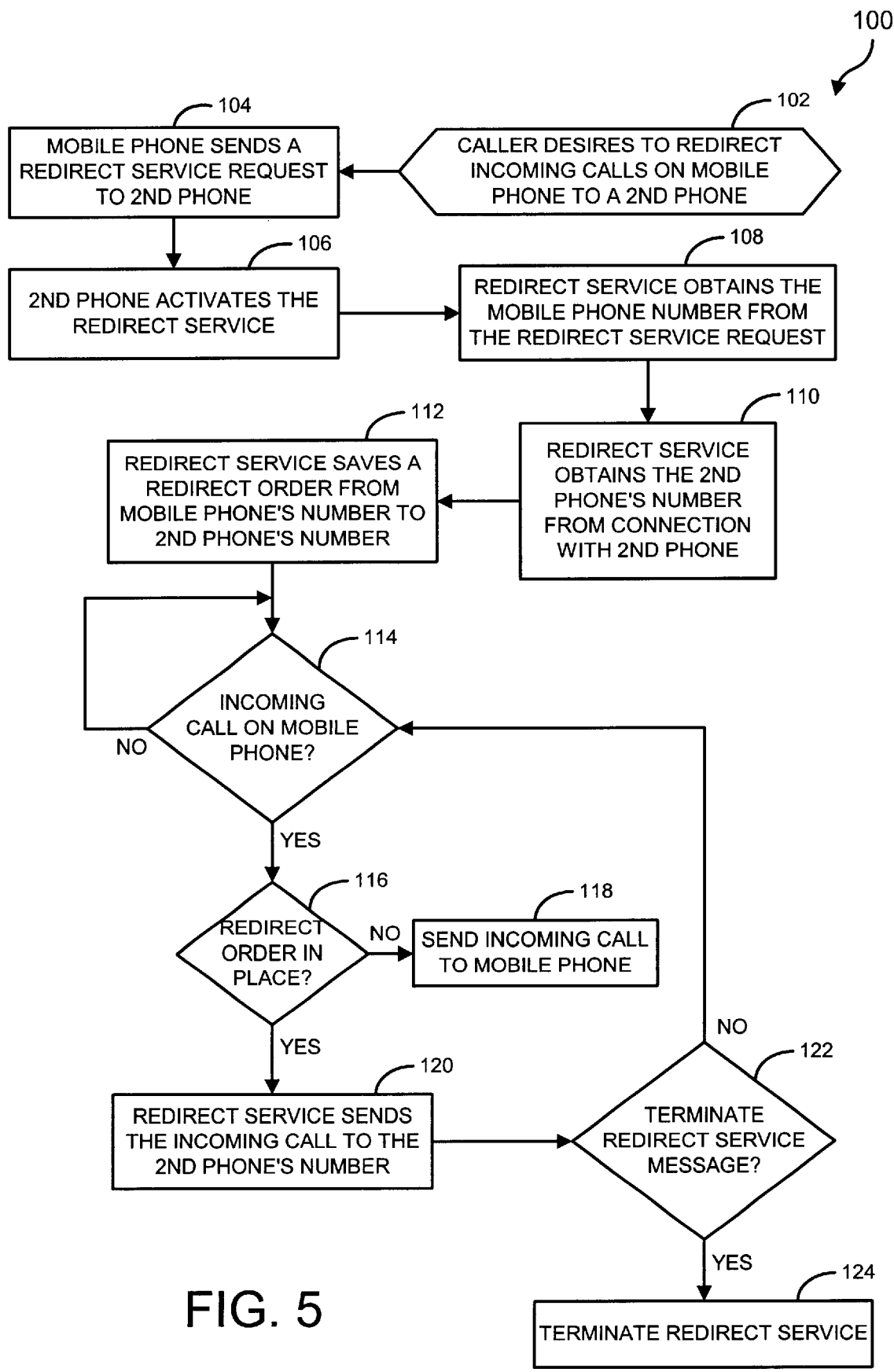
FIG. 5 is a flow chart illustrating the preferred functionality of a method of the present invention.

Turning to an important aspect of the preferred embodiment of the present invention, a flow chart of the preferred functionality of a method is shown in FIG. 5, and indicated generally at 100. The method is initiated by a user desiring to redirect incoming calls on the mobile phone to a second phone (Block 102). The mobile phone first sends a redirect service request to the second phone. (Block 104). The redirect button on the mobile phone is generally used to initiate such a redirect service request to the second phone. The second phone accordingly activates the redirect service (Block 106) by preferably dialing a redirect phone number contained in the redirect service request. However, other ways to activate the redirect service through the second phone can be implemented, and these other implementations are within the scope of the present invention.

It is important to note that the present invention allows the mobile phone to direct a second phone, which can be a standard, to activate the redirect service. Using a single push of the redirect button, the redirect service is activated without the user entering any more information, such as the second phone's number. The present invention allows for a simpler and more direct use of the redirect service on a mobile phone, and the activation of the redirect service is less dependent on the range capability and battery power of the mobile phone. Furthermore, the present invention allows a way for the redirect service to obtain the mobile phone's number and the second phone's number without any user interventions. This available feature can be very desirable, especially when the user does not necessarily know the second phone's number for the redirecting service.

The redirect service accordingly obtains the mobile phone number from the redirect request (Block 108). Since the redirect service was activated by the second phone, the redirect service, as a result, is able to obtain the second phone's number through its connection with the second phone (Block 110), such as caller identification. Again, it is important to note that users do not necessarily have to enter any of these numbers. The present invention is configured so that the redirect service can obtain these numbers without user intervention.

After the redirect service obtains both the mobile phone's number (Block 108) and the second phone's number (Block 110), the redirect service accordingly saves a redirect order for redirecting calls from the mobile phone's number to the second phone's number (Block 112). Next, the redirect service determines whether there are any incoming calls on the mobile phone (Block 114). If not, it waits until there is an incoming call on the mobile phone (Block 116). The preferred implementation is that the redirect service simply waits until a call to the mobile phone is received. Otherwise, it does nothing but wait for a call to come in.

Once an incoming call to the mobile phone does come in (Block 114), the redirect service determines whether there is a redirect order saved on the service (Block 116). If not (Block 116), the redirect service sends the incoming call to the mobile phone (Block 118). On the other hand, if there is a redirect order saved (Block 116), the redirect service sends the incoming call to the second phone's number designated in the redirect order (Block 120). Next, the redirect service checks whether there is a terminate redirect service message (Block 122). If so, the redirect service will be accordingly terminated (Block 124). Otherwise, it waits for another incoming call to the mobile phone (Block 114).

From the foregoing description, it should be understood that an improved method and system for redirecting calls to a mobile phone to a second phone via a redirect service has been shown and described, which has many desirable attributes and advantages. The method and system provide a way for users to easily activate the redirect service without requiring the user to enter the necessary phone numbers for the redirection. In addition, the present invention is configured to obtain the phone number to which the calls should be directed. As a result, the users are no longer required to know the phone number of the phone to which the user desires to use. Furthermore, with the use of a redirect functionality located on the mobile phone, users are enable to direct the second phone to activate the redirect service, which is less dependent on the range capacity and battery power of the mobile phone. The present invention provides a simple and flexible way for the mobile phone to activate the redirect service.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A method for redirecting calls placed to a mobile phone to a second phone, comprising:
    initializing call redirection by sending a redirect service request from the mobile phone to the second phone using a redirect functionality of the mobile phone;
    relaying the redirect service request from the second phone to a redirect service to activate the redirect service by having the second phone dial the redirect service and provide phone number of the mobile phone and the second phone; and
    redirecting incoming calls with the redirect service such that calls to the mobile phone are redirected to the second phone without any communication being sent to the mobile phone.

2. The method according to claim 1 wherein the redirect functionality comprises one of a redirect button physically placed on the mobile phone, a menu selection displayed on the screen of the mobile phone, or a voice activated mechanism.

3. The method according to claim 1 wherein the second phone comprises one of a land-line phone, a mobile phone, or an Internet phone.

4. The method according to claim 1 further comprising:
    determining whether there is an incoming call to the mobile phone;
    redirecting the incoming call to the second phone number when there is an incoming call; and
    repeating said step of determining whether there is an incoming call to the mobile phone until an incoming call is received.

5. The method of claim 1, wherein sending a redirect service request comprises sending an infrared signal to the second phone.

6. The method of claim 1, wherein sending a redirect service request comprises sending a radio frequency signal to the second phone.

7. The method of claim 1, wherein sending a redirect service request comprises sending an analog signal to the second phone.

8. The method according to claim 1 further comprising saving a redirect order redirecting incoming calls to the mobile phone number to the second phone number provided to the redirect service.

9. The method according to claim 8 further comprising:
    determining whether there is a redirect order saved on the redirect service upon an incoming call on the mobile phone;
    sending the incoming call to the mobile phone number when there is no redirect order saved; and
    sending the incoming call to the second phone number when there is a redirect order saved.

10. The method according to claim 8 further comprising:
    determining whether there is a request to terminate the redirect service; and
    terminating the redirect service when there is a request to terminate.

11. The method according to claim 10 wherein the termination of the redirect service is initiated from the redirect functionality on the mobile phone.

12. A system for redirecting, comprising:
    a mobile phone having a redirect functionality that is configured to initiate sending of a redirect service request to a physically proximate phone so as to initialize redirection of calls to the physically proximate phone;

a second phone having an associated redirect device that is configured to receive a redirect service request from a physically proximate mobile telephone and relay the request to a redirect service by calling the redirect service and providing a phone number of the mobile phone and the second phone, the second phone also being configured to receive redirected incoming calls;

a redirect service that is configured to receive a redirect service request from the second phone and redirect incoming calls to a mobile phone to the second phone; and an activator that is configured to activate the redirect service responsive responsive to a redirect service request in a manner such that calls to the mobile phone are automatically redirected to the second phone without requiring action by the mobile phone.

13. The system as defined in claim 12 wherein said redirect service request comprises instructions directed to the second phone for activating the second phone, and the phone number of the mobile phone.

14. The system as defined in claim 12 wherein said mobile phone is configured to send an analog signal containing the redirect service request to the microphone of said second phone.

15. The system as defined in claim 12 wherein said activator is a redirect service phone number assigned to the redirect service, wherein said redirect service is activated by the second phone dialing said redirect service phone number for connection with said redirect service.

16. The system as defined in claim 12 wherein said mobile phone and said second phone comprise infrared communication components that facilitate sending of the redirect service request from said mobile phone to said second phone.

17. The system as defined in claim 16 wherein said infrared communication component of said mobile phone is initiated by said redirect functionality on said mobile phone.

18. The system as defined in claim 16 wherein said mobile phone is configured to transmit an infrared signal including the redirect service request and the mobile phone number to said second phone, said second phone being configured to initiate said activator with the information received from said mobile phone and the second phone number responsive to said infrared signal being received.

19. The system as defined in claim 12 wherein said mobile phone and said second phone comprise radio frequency communication components that facilitate sending of the redirect signal request from said mobile phone to said second phone.

20. The system as defined in claim 19 wherein said radio frequency communication component of said mobile phone is initiated by said redirect functionality on said mobile phone.

21. The system as defined in claim 19 wherein said mobile phone is configured to transmit a radio frequency signal including the redirect service request and the mobile phone number to said second phone.

22. A method for facilitating call redirection, comprising the steps of:

receiving with a land-line phone a redirect service request generated by a physically proximate mobile phone having a redirect functionality; and relaying the redirect service request from the land-line phone to a redirect service by calling the redirect service from the land-line phone such that the redirect service will redirect calls intended for the mobile phone to the land-line telephone without requiring action by the mobile telephone.

23. The method of claim 22, wherein receiving the redirect service request comprises:

receiving a telephone number of the mobile phone.

24. The method of claim 22, wherein receiving the redirect service request comprises receiving an infrared signal having the redirect service request.

25. The method of claim 22, wherein receiving the redirect service request comprises receiving a radio-frequency signal having the redirect service request.

26. The method of claim 22, wherein receiving the redirect service request comprises receiving an analog audio signal having the redirect service request.

27. The method of claim 22, further comprising:

receiving with the land-line phone a second redirect service request generated by a physically-proximate mobile phone having a redirect functionality; and relaying the second redirect service request from the land-line phone to the redirect service by calling the redirect service from the land-line phone such that the redirect service will terminate redirection of calls to the land-line phone.

28. The method of claim 22, wherein relaying the redirect service request comprises relaying a telephone number of the land-line phone from the land-line phone to the redirect service.

* * * * *